United States Patent
Stretton

(10) Patent No.: US 8,297,038 B2
(45) Date of Patent: Oct. 30, 2012

(54) GAS TURBINE AIRCRAFT ENGINES AND OPERATION THEREOF

(75) Inventor: Richard G. Stretton, Loughborough (GB)

(73) Assignee: Rolls-Royce, PLC, London (GB)

( * ) Notice: Subject to any disclaimer, the term of this patent is extended or adjusted under 35 U.S.C. 154(b) by 56 days.

(21) Appl. No.: 12/877,493

(22) Filed: Sep. 8, 2010

(65) Prior Publication Data

US 2011/0067412 A1 Mar. 24, 2011

(30) Foreign Application Priority Data

Sep. 21, 2009 (GB) .................................. 0916491.4

(51) Int. Cl.
*B63H 11/00* (2006.01)
(52) U.S. Cl. ............................... 60/204; 60/266; 60/785
(58) Field of Classification Search ................. 60/39.08, 60/226.1, 266–267, 728, 782, 785, 795; 184/6.11; 244/53 B
See application file for complete search history.

(56) References Cited

U.S. PATENT DOCUMENTS

| | | | | |
|---|---|---|---|---|
| 3,527,054 A | * | 9/1970 | Hemsworth | 60/39.08 |
| 4,914,904 A | * | 4/1990 | Parnes et al. | 60/226.1 |
| 5,149,018 A | * | 9/1992 | Clark | 244/117 A |
| 2005/0268612 A1 | | 12/2005 | Rolt | |
| 2009/0165995 A1 | * | 7/2009 | Bajusz et al. | 165/51 |

FOREIGN PATENT DOCUMENTS

WO WO 92/11451 A1 7/1992

OTHER PUBLICATIONS

Great Britain Search Report dated Jan. 22, 2010 in Great Britain Patent Application No. 0916491.4.

* cited by examiner

*Primary Examiner* — Phutthiwat Wongwian
(74) *Attorney, Agent, or Firm* — Oliff & Berridge, PLC

(57) ABSTRACT

An aircraft propulsion arrangement including a gas turbine aircraft engine having a compressor, an oil system configured to route engine oil through a heat exchanger mounted to an external surface of an aircraft component so as to define part of an aerodynamic surface to a flow of ambient air, and a duct arrangement fluidly connecting the compressor to the heat exchanger. A method of operating the gas turbine aircraft engine, the method involving the steps of: (a) flowing engine oil through the heat exchanger and thus into heat-exchange relationship with the ambient air; and (b) directing a bleed flow of compressor gas drawn from the compressor along the duct arrangement and into heat-exchange relationship with the engine oil in the heat exchanger, wherein the directing step (b) is performed selectively.

27 Claims, 2 Drawing Sheets

GAS TURBINE AIRCRAFT ENGINES AND OPERATION THEREOF

The present invention relates to aircraft propulsion via the use of gas turbine engines. More particularly, the invention relates to a method of operating a gas turbine aircraft engine, and to an aircraft propulsion arrangement comprising a gas turbine engine.

All aero gas turbine engines incorporate an oil system to provide lubrication, cooling, and corrosion protection for gears, bearings and shaft couplings. Engine oil is also commonly used as a sealing medium between rotating engine shafts. Most gas turbine engines use a self-contained recirculatory oil system that distributes oil to components throughout the engine from an oil tank or reservoir via oil pumps.

As will be appreciated, it is necessary to cool the engine oil circulating around the oil system to maximise its cooling function, but also to prevent the loss of oil properties through overheating. Aircraft fuel may be used to coil the oil, but the use of air for cooling purposes is generally more convenient. The present invention is directed to the use of air for oil cooling purposes.

When an aircraft is moving, ambient air flows across the aerodynamic surfaces of the aircraft. Whilst surface-mounted heat exchangers have been proposed previously to make use of this flow of ambient air, such arrangements are typically used only to cool the flow of working gas passing through the core of the engine, between the engine's high and low pressure compressors. U.S. 2005/0268612A2 discloses an arrangement of this type, where the heat exchanger is mounted on the nacelle of the engine and hence defines part of the nacelle's aerodynamic surface. The core flow of working gas is ducted through the heat exchanger and is hence passed in heat-exchange relationship with the flow of ambient air over the surface of the nacelle as the aircraft is propelled through the ambient air. This heat exchanger arrangement thus serves as part of an intercooler system.

The use of surface-mounted heat exchangers similar to the type proposed in U.S. 200510268612A2 have not been used widely for the purpose of cooling engine oil. This is because the cooling requirements are quite different for the engine oil than for the "intercooler" purposes mentioned above. For example, oil is of course a liquid and is flowed around the oil system at much lower flow speeds than the flow of working gas through the compressors of the engine. Also, the function of the oil in lubricating and cooling moving parts of the engine, means that it requires very effective cooling during periods of high-speed engine operation at low airspeed. For example, during certain periods of a typical flight cycle, such as take-off and reverse thrust immediately after landing, the engine is operated at very high power and rotational speed whilst the airspeed of the aircraft is low, meaning that the flow of ambient air across a surface-mounted heat exchanger would be low and hence ineffective in providing sufficient cooling of the oil during such periods. The present invention seeks to address this issue.

It is therefore an object of the present invention to provide an improved method of operating a gas turbine aircraft engine. It is another object of the invention to provide an improved propulsion arrangement for an aircraft.

According to a first aspect of the present invention, there is provided a method of operating a gas turbine aircraft engine having a compressor, an oil system configured to route engine oil through a heat exchanger mounted so as to define part of an aerodynamic surface to the flow of ambient air, and a duct arrangement fluidly connecting the compressor to the heat exchanger, the method involving the steps of: (a) flowing engine oil through the heat exchanger and thus into heat-exchange relationship with said ambient air; and (b) directing a bleed flow of compressor gas drawn from the compressor along said duct arrangement and into heat-exchange relationship with said oil in said heat exchanger, wherein said directing step (b) is performed selectively.

Preferably, said directing step (b) is performed selectively in dependence on the temperature of said engine oil measured within the engine. For example, said compressor gas may be directed into heat exchange relationship with said oil in said heat exchanger when the measured temperature of said oil is above a predetermined threshold value. Said flow of compressor gas may be stopped or reduced when the measured temperature of said oil is below said predetermined threshold value.

Conveniently, said directing step (b) is performed selectively in dependence on aircraft flight cycle conditions. For example, said compressor gas may be directed into heat exchange relationship with said oil in said heat exchanger during at least one of the following flight cycle conditions: stationary; taxi; take-off; landing-approach; and reverse-thrust. The flow of compressor gas may be stopped or reduced during at least one of the following flight conditions: climb; cruise; and descent.

Advantageously, said directing step (b) is performed selectively in dependence on the airspeed of the aircraft. For example, said compressor gas may be directed into heat exchange relationship with said oil in said heat exchanger when the airspeed of the aircraft is below a determined or predetermined threshold value. The flow of compressor gas may stopped or reduced when said airspeed is above said threshold value. The threshold value may be determined in dependence on aircraft flight cycle conditions.

Preferably, the engine is supported by a pylon to which said heat exchanger is mounted, and the method further comprises the step of exhausting said flow of compressor gas into the wake produced by the pylon.

Conveniently, the flow of compressor gas is directed across said aerodynamic surface of the heat exchanger. Alternatively, flow of compressor gas is directed across a surface of said heat exchanger opposed to said aerodynamic surface.

According to a second aspect of the present invention, there is provided a propulsion arrangement for an aircraft, the arrangement including: a heat exchanger mounted so as to define part of an aerodynamic surface to the flow of ambient air; a gas turbine engine having a compressor with a bleed offtake configured to bleed gas from the compressor; an oil system configured to route engine oil through the heat exchanger, and a duct arrangement fluidly connecting the bleed offtake to the heat exchanger and configured to direct a flow of said compressor gas across the heat exchanger in heat-exchange relationship with said oil, the arrangement further including a flow controller actuable to regulate the flow of compressor gas across the heat exchanger.

Preferably, said flow controller is programmed to regulate the flow of compressor gas across the heat exchanger in dependence on at least one of the following: (i) the temperature of said oil within the engine; (ii) the airspeed of the aircraft; and (iii) aircraft flight cycle conditions.

The engine is preferably supported by a pylon to which said heat exchanger is mounted, the pylon having an exhaust aperture. In such an arrangement, the duct arrangement is preferably configured to direct said flow of compressor gas into said pylon, through the exhaust aperture and into the wake produced by the pylon during movement through the ambient air.

The exhaust aperture may be located upstream of the heat exchanger, relative to the flow of compressor gas. Preferably, the heat exchanger is located in the region of the trailing edge of said pylon.

Alternatively, the exhaust aperture may be located downstream of the heat exchanger, relative to the flow of compressor gas. Preferably, the exhaust aperture is located in the region of the trailing edge of said pylon.

Conveniently, said flow controller comprises a control valve within the engine.

Advantageously, said flow controller comprises a mechanism operable to vary the size of said exhaust aperture.

The oil system preferably includes a bypass valve selectively operable to prevent the flow of oil through the heat exchanger.

Conveniently, said heat exchanger is remote from the engine, and said engine oil system includes self-sealing couplings arranged to permit disconnection and reconnection of the oil system to the heat exchanger, the oil system further comprising a bypass valve connected across said self-sealing couplings.

According to a third aspect of the present invention, there is provided a method of operating a gas turbine aircraft engine supported by a pylon defining an aerodynamic surface and incorporating a heat exchanger, the engine having a compressor, an oil system configured to route engine oil through the heat exchanger, and a duct arrangement fluidly connecting the compressor to the heat exchanger, the method involving: flowing engine oil through the heat exchanger, directing a bleed flow of compressor gas drawn from the compressor along said duct arrangement and into heat-exchange relationship with said oil in said heat exchanger, and exhausting said flow of compressor gas into the wake produced by said pylon.

According to a fourth aspect of the present invention, there is provided an aircraft propulsion arrangement, the arrangement including: a gas turbine engine supported by a pylon and having a compressor with a bleed offtake configured to bleed gas from the compressor, the pylon defining an aerodynamic surface and incorporating a heat exchanger; an oil system configured to route engine oil through the heat exchanger; and a duct arrangement fluidly connecting the bleed offtake to the heat exchanger and configured to direct a flow of said compressor gas across the heat exchanger in heat-exchange relationship with said oil and to exhaust said flow of compressor gas into the wake produced by said pylon.

So that the invention may be more readily understood, and so that further features thereof may be appreciated, embodiments of the invention will now be described by way of example with reference to the accompanying drawings in which.

Figure 1:
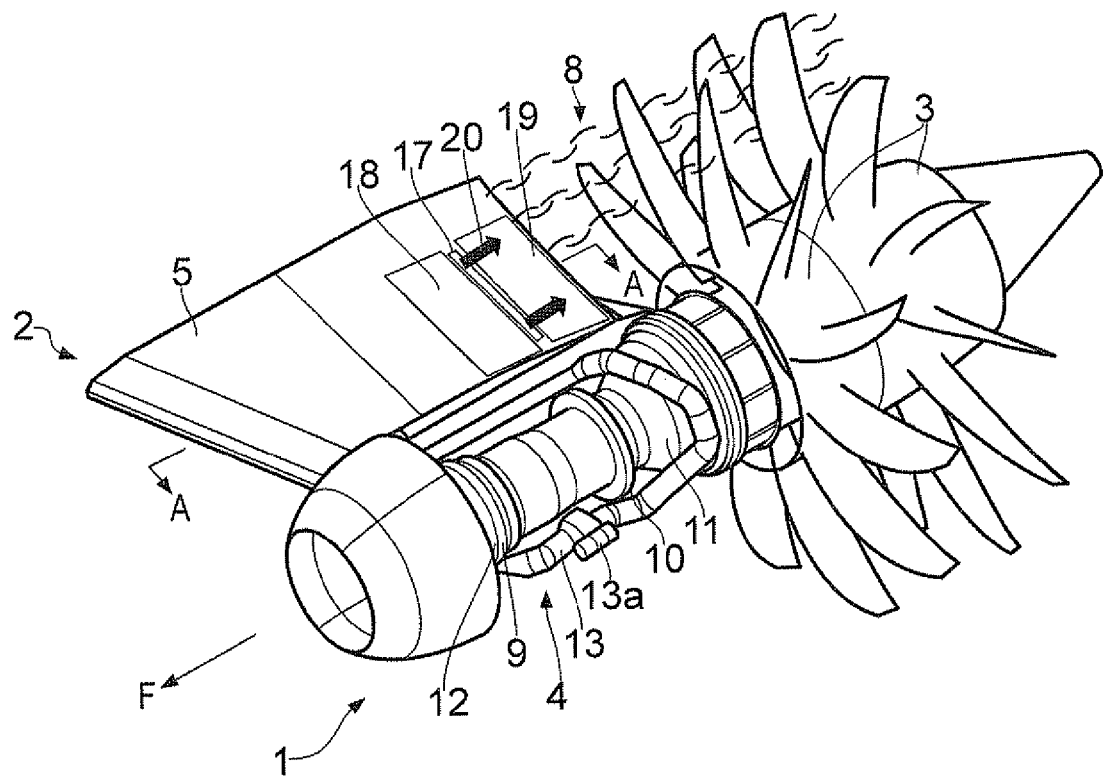
FIG. 1 is a schematic perspective view of an aircraft propulsion arrangement in accordance with the present invention, in which an open-rotor gas turbine engine is mounted to the airframe of an aircraft via a pylon.

Referring initially to FIG. 1, there is illustrated a gas turbine engine 1 supported by a pylon 2, via which the engine is mounted to the airframe of an aircraft (not shown). in the particular arrangement illustrated in FIG. 1, the engine is shown in the form of an open-rotor "pusher" type configuration having a pair of counter-rotating rotors located downstream of the core engine 4, and also downstream of the pylon 2. As will be appreciated, the rotors 3 each have a plurality of radially arranged blades and are effective to propel the engine, and hence the aircraft, forwards in a direction indicated generally by arrow F in FIG. 1. However, it is to be noted that whilst the illustrated embodiment offers particular advantages to open-rotor "pusher" type engines, the invention is not restricted to such engines, and can also be applied to more common turbofan engines having a ducted propulsive fan upstream of the core engine 4, or even to turboprop engines having an unducted propulsive propeller upstream of the core engine 4.

As illustrated in FIG. 1, the pylon 2 has an aerodynamic fairing 5 which defines an outer surface across which ambient air will flow during forward movement of the aircraft. Accordingly, the pylon 2 has a generally rounded leading edge 6, and a tapering cross-sectional form terminating with a relatively narrow trailing edge 7 as shown most clearly in FIG. 2. As is conventional, the fairing 5 is carefully designed so as to present as little obstruction to the flow of ambient air as possible, for reasons of minimising drag. Nevertheless the pylon will inevitably shed a wake as it moves through the ambient air, as illustrated schematically at 8 in FIG. 1.

As will be appreciated, in the case of a pusher-type engine of the configuration illustrated in FIG. 1, the blades of the propulsive rotors 3 pass through the wake 8 as the rotors rotate. As the rotor blades move across the wake 8 in this manner, they effectively chop the wake and in so doing generate noise which can become problematic unless the wake is carefully managed. Also, the effective angle of attack of each rotor blade changes as it moves into and out of the wake 8 during each revolution of the rotor. This change in angle of attack creates a variation in the load applied to the rotor blades during each revolution of the rotor, thereby causing the blades to flex, and thus creating vibrations in the rotor assembly which can also become problematic unless the wake is carefully managed. The particular arrangement of the present invention illustrated is therefore configured to reduce size of the wake 8 produced by the pylon 2, in a manner which will be described in more detail below, in order to reduce these effects.

The engine 1 is shown in FIG. 1 with its outer casing or nacelle removed such that the structure of the inner core engine 4 is visible. In particular, it will be noted that the core engine comprises a compressor assembly 9, combustion equipment 10, and a turbine assembly 11 arranged in axial flow series in a generally conventional manner. The compressor assembly is provided with a bleed offtake 12 which is configured to bleed gas from the compressor assembly, and most preferably from an offtake point located between adjacent stages of the engine's low pressure compressor. The bleed offtake 12 is fluidly connected to a bleed duct 13 which extends from the compressor assembly 9, round the downstream region of the core engine 4 and which is then directed into the internal structure of the pylon 2. A flow control valve 13a is provided in the bleed duct, the control valve being operable to control the flow of compressor gas fed into the pylon 2 via the bleed duct 13.

Figure 2:
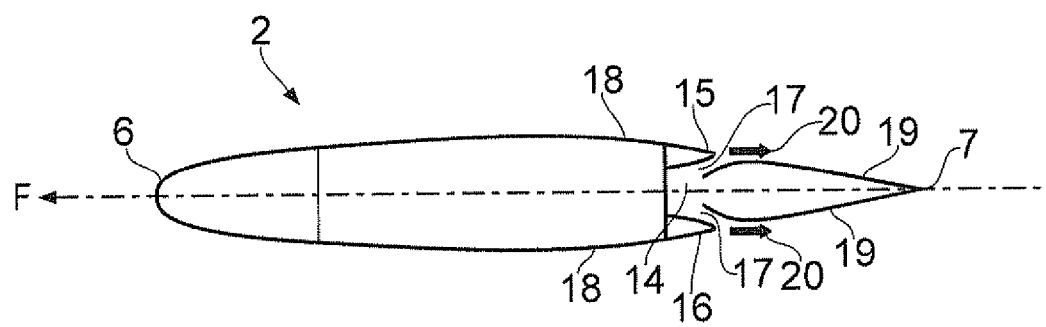
FIG. 2 is a cross-sectional view taken along line A-A in FIG. 1, showing the structure of the pylon in more detail.

FIG. 2 shows the internal structure of the pylon in more detail, and in particular shows a plenum chamber 14 provided within the fairing 5 and located immediately upstream of the pylon's trailing edge 7. The two opposed surfaces 15, 16 of the fairing 5 are each provided with a respective exhaust aperture 17 on either side of the plenum, in the form of an elongate slot located in the region upstream of the trailing edge 7, and in direct fluid communication with the plenum chamber 14. The bleed duct 13 is arranged to direct the bleed flow of compressor gas drawn from the bleed offtake 12 into the plenum chamber 14.

The pylon 2 additionally comprises heat exchangers arranged in pairs on the outer surface of the fairing 5. In particular, it will be noted that an upstream pair of heat exchangers 18 are mounted to respective surfaces 15, 16 immediately upstream of the exhaust apertures 17. Similarly, a downstream pair of heat exchangers 19 are mounted to respective surfaces 15, 16 immediately downstream of the exhaust apertures 17. Each heat exchanger 18, 19 thus forms part of the aerodynamic surface of the pylon. In a manner which will be explained in more detail below, each of the heat exchangers is fed with a supply of engine oil, the engine oil thus being routed through the heat exchangers 18, 19 during operation of the engine.

The exhaust apertures 17 are thus effective to exhaust a flow of compressor gas fed to the plenum chamber 14 via the duct 13. As the pylon 2 moves forwardly through the ambient air in the direction indicated by arrow F, the compressor gas is thus exhausted through the exhaust apertures and directly into the boundary layer of ambient airflow past the pylon, and into the wake 8. This has three effects. Firstly, the exhausted flow of compressor gas is caused to flow across the surfaces of the two downstream heat exchangers 19 as indicated by arrows 20, and thus into heat-exchange relationship with the engine oil flowing through the heat exchangers 19, which is effective to cool the oil. Secondly, the exhaust flow 20 entrains a flow of ambient air across the upstream heat exchangers 18 and thus into heat-exchange relationship with the oil (thereby cooling the oil) in the event that the pylon 2 is not moving at sufficient speed relative to the ambient air to do so itself. Thirdly, the exhaust flow 20 serves to increase the overall velocity of air in the region of the wake 8, thereby effectively reducing the disadvantageous wake effects mentioned above.

Figure 3:
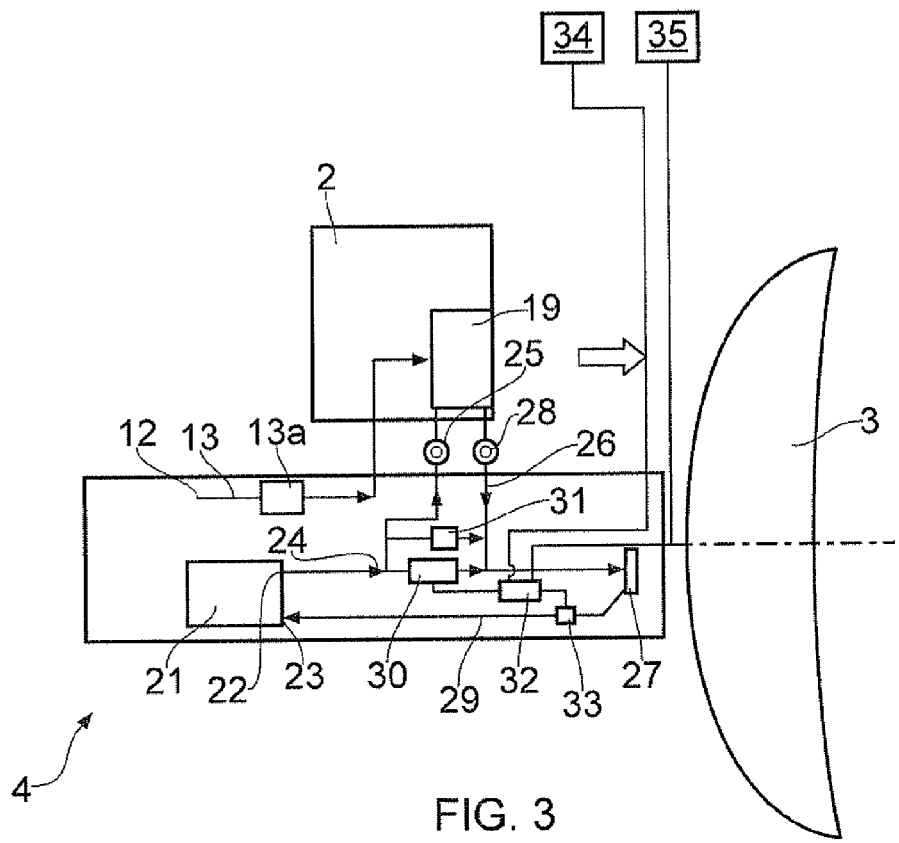
FIG. 3 is a schematic diagram showing the oil and air flow system of the arrangement illustrated in FIGS. 1 and 2.

FIG. 3 illustrates the oil system of the engine 1 in schematic form. As will be noted, the engine includes an oil pump 21 having an outlet port 22 and a return inlet port 23. The outlet port 22 is connected to an oil supply line 24 which is provided in fluid connection to the heat exchangers 18, 19 (only the downstream heat exchanger 19 being shown in FIG. 1 for clarity) via a self-sealing coupling 25. An intermediate oil line 26 fluidly connects the heat exchangers 18, 19 to the components 27 of the engine requiring lubrication, via another self-sealing coupling 28. The self-sealing couplings are provided in order to permit convenient disconnection of the oil lines 24, 26 from the pylon 2 during engine removal, and connection of the oil lines 24, 26 during engine installation, in order to avoid oil loss. An oil return line 29 fluidly connects an oil scavenge system associated with the lubricated components 27 to the inlet port 23 of the oil pump 21. As will be appreciated, the oil pump 21 thus serves to pump engine oil around a circuit passing through the heat exchangers 18, 19 and supplying oil to the engine components 27.

The oil supply line 24 and the intermediate oil line 26 are interconnected on the engine side of the engine-pylon interface by a pair of bypass valves, namely a bypass control valve 30, and a pressure bypass valve 31. The bypass control valve 30 is operatively connected to an electronic control unit 32 arranged to receive signals from an oil temperature sensor 33 provided in the oil return line 29. The control unit 32 is configured to control the operation of the bypass valve 30 in an active manner described in more detail below, and may also be connected to other aircraft sensors or avionic systems, such as an airspeed sensor 34 and/or flight computer 35. The pressure bypass valve 31, on the other hand, is configured for passive operation and is adapted to be opened by a build up of oil pressure in the oil supply line 24 (as might occur for example in the case of a blockage in the heat exchanger 19), thereby bypassing the pylon and its associated heat exchangers and instead permitting the oil to circulate around the engine oil circuit. The pressure bypass valve 31 also protects against the loss of engine oil from the main oil circuit in the event that the self-sealing couplings 25, 28 are not connected properly.

The control unit 32 is also operatively connected to the control valve 13a and configured to control the valve 13a.

It is envisaged that when the engine is operated during periods of relatively high airspeed, the flow of ambient air over the heat exchangers 18, 19 as a result of forward movement of the pylon will generally provide sufficient cooling effect to maintain the engine oil temperature, as detected by the temperature sensor 33, within a suitable predetermined working temperature range. However, as the airspeed falls, a point will be reached at which the flow of ambient air across the aerodynamic surfaces of the heat exchangers 18, 19 will become insufficient to properly cool the oil in order to maintain its temperature within the working range. The control unit 32 is thus configured to operate the control valve 13a in order to direct a flow of compressor gas drawn from the compressor assembly 9, along the duct 13 and into the plenum chamber 14 defined within the pylon 2, from where the relatively cool compressor gas will be exhausted through the exhaust slots 17 and into the wake 8, flowing across the downstream heat exchangers 19 as it does so. This flow of compressor gas will thus be directed into heat-exchange relationship with the oil within the downstream heat exchangers 19 so as to cool the oil. Additionally, at very low airspeeds or when the aircraft is stationary, the exhaust flow exiting the apertures 17 will tend to entrain a flow of ambient air across the upstream heat exchangers 18 and thus into heat-exchange relationship with the oil in the manner mentioned above, thereby contributing an additional cooling effect.

More particularly, it is envisaged that the controller 32 will most preferably control the control valve 13a in response to signals received from the temperature sensor 33 so as to direct said compressor gas into the plenum 14 within the pylon selectively and in dependence on the temperature of the engine oil. in such an arrangement, the controller 32 will be configured to open the valve 13a and thus direct the compressor gas into heat-exchange relationship with the oil when the temperature of the oil detected by the sensor 33 exceeds a predetermined threshold value, and to stop or at least reduce the flow of compressor gas to the heat exchangers when the oil temperature falls below the threshold value.

Additionally, or independently, the controller may be configured to control the control valve 13a, and hence selectively direct compressor gas to the heat exchangers in dependence on signals received from the flight computer 35 and/or the airspeed sensor 34. For example, the system may be configured so as to open the control valve 13a and direct the compressor gas to the heat exchangers during one or more of the following flight cycle conditions: stationary on ground; taxi; take-off; landing approach; and reverse-thrust; those being conditions during which airspeed is relatively low and/or engine speed is relatively high, thus necessitating high levels of oil cooling. Conversely, the system may be configured to close the control valve 13a and hence stop or at least reduce the flow of compressor gas to the heat exchangers during one or more of the following flight cycle conditions: climb; cruise; descent; those being conditions during which airspeed is relatively high such that the oil-cooling contribution from the ambient air flowing over the upstream heat exchangers 18 is likely to be sufficient to cool the oil.

Because the flow of compressor gas through the exhaust apertures 17 and into the boundary layer of flow around the pylon 2 can be used to reduce the effects of the wake 8, it may be desirable to make use of this effect even when the ambient airflow across the upstream heat exchangers 18 is sufficient to cool the oil. In such a situation, the additional flow of compressor gas across the downstream heat exchangers could overcool the oil. In order to avoid this, the controller 32 is configured to control the operation of the bypass control valve 30 in dependence on signals received from the temperature sensor 33 representative of the oil temperature. More particularly, when the controller 32 receives a signal from the sensor 33 indicating that the oil temperature has fallen below a predetermined minimum threshold value, the controller will open the bypass control valve 30, thereby diverting the oil such that it no longer flows through the heat exchangers 18, 19. This allows the compressor gas to be used for wake control without overcooling the engine oil. Without being cooled in the heat exchangers 19, the temperature of the oil will then begin to rise during operation of the engine, and so when the temperature rises above the threshold value the controller will close the bypass control valve 30 and thus direct the oil through the heat exchangers once again.

Figure 4:
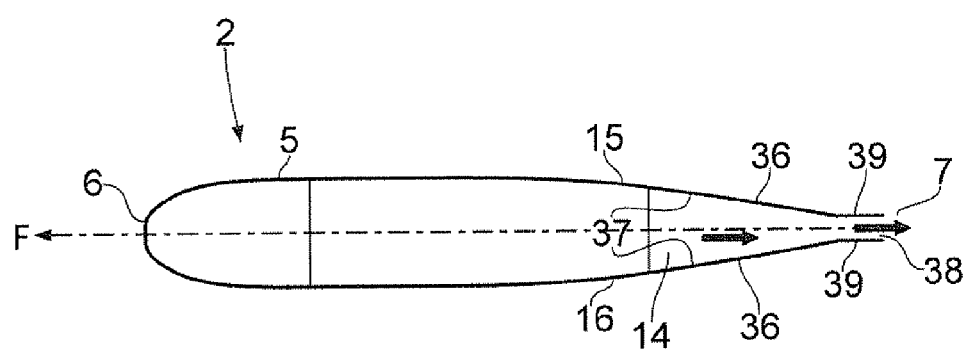
FIG. 4 is a cross sectional view similar to that of FIG. 2, but showing the structure of a pylon in accordance with an alternative embodiment of the invention.

Turning now to consider FIG. 4, there is illustrated an alternative pylon structure. In this arrangement, it will be noted that the pylon is provided with only a single pair of heat exchangers 36 on the outer surface of the fairing 5, immediately upstream of the trailing edge 7 of the pylon. However, it will be noted that the heat exchangers 36 are again mounted on respective sides of the plenum chamber 14 formed within the pylon. Also, each heat exchanger 36 again forms part of the outer aerodynamic surface of the pylon, and is fed with a supply of engine oil in the same manner as previously described above in the context of the arrangement illustrated in FIG. 2. Accordingly, ambient air flowing across the outer surfaces of the heat exchangers 36 during movement of the aircraft through the ambient air will be effective to cool the oil.

Each heat exchanger 36 additionally defines an inner surface 37, opposed to the outwardly directed aerodynamic surface, and is arranged such that its inner surface 37 defines part of the plenum chamber 14.

The oppositely directed exhaust apertures 17 formed in the upper and lower surfaces 15, 16 of the pylon illustrated in FIG. 2 have been replaced by a single exhaust aperture 38, again in the form of slot, but formed along the trailing edge 7 of the pylon. The exhaust aperture 38 is furthermore configured to be variable in size. More particularly, it is envisaged that the variable exhaust aperture 38 will be defined between a pair of opposed flaps 39, each of which is hingedly mounted to the structure of the pylon 2 at its trailing edge, the two flaps 39 being moveable relative to one another by suitable actuators operated under the control of the controller 32.

When the flaps 39 are set apart from one another such that the exhaust aperture 38 is open, compressor gas directed to the plenum 14 from the duct 13 will flow out of the plenum through the exhaust aperture 38 (and directly into the wake 8 behind the pylon if the aircraft is moving). In so doing, the compressor gas will be directed across the inner surfaces 37 of the heat exchangers 36 and thus into heat-exchange relationship with the oil, thereby supplementing any cooling effect arising from the flow of ambient air over the opposed outer surfaces of the heat exchangers. Closure of the exhaust aperture 38 by movement of the flaps 39 towards one another under the control of the controller 32 will thus be effective to stop the flow of compressor gas out of the plenum, with the result that the flow across the inner surfaces 37 of the heat exchangers will also be stopped. As will thus be appreciated, by controlling the movement of the flaps 39 in this way, the variable exhaust aperture 38 can be used to control the flow of compressor gas across the heat exchangers, thereby obviating the need for the control valve 13a provided in the duct 13 of the arrangement illustrated in FIG. 2. However, in an alternative arrangement, it is envisaged that the flaps 39 could be hingedly mounted to the structure of the pylon in a free floating manner, with the opening angle of the flaps determined by the balance of the internal and external pressures acting on the flaps. In such an arrangement, it is envisaged that the control valve 13a in the duct 13 would be retained in order to control the flow of compressor gas across the inner surfaces 37 of the heat exchangers 36.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A method of operating a gas turbine aircraft engine having a compressor, an oil system configured to route engine oil through a heat exchanger mounted to an external surface of an aircraft component so as to define part of an aerodynamic surface to a flow of ambient air, and a duct arrangement fluidly connecting the compressor to the heat exchanger, the method involving the steps of (a) flowing the engine oil through the heat exchanger and thus into heat-exchange relationship with the ambient air; and (b) directing a bleed flow of compressor gas drawn from the compressor along the duct arrangement and into heat-exchange relationship with the engine oil in the heat exchanger, wherein the directing step (b) is performed selectively.

2. A method according to claim 1, wherein the directing step (b) is performed selectively in dependence on a temperature of the engine oil measured within the gas turbine aircraft engine.

3. A method according to claim 2, wherein the compressor gas is directed into heat exchange relationship with the engine oil in the heat exchanger when the measured temperature of the engine oil is above a predetermined threshold value.

4. A method according to claim 3, wherein the bleed flow of compressor gas is stopped or reduced when the measured temperature of the engine oil is below the predetermined threshold value.

5. A method according to claim 1, wherein the directing step (b) is performed selectively in dependence on aircraft flight cycle conditions.

6. A method according to claim 5, wherein the compressor gas is directed into heat exchange relationship with the engine oil in the heat exchanger during at least one of the following flight cycle conditions: stationary; taxi; take-off; landing-approach; and reverse-thrust.

7. A method according to claim 6, wherein the bleed flow of compressor gas is stopped or reduced during at least one of the following flight conditions: climb; cruise; and descent.

8. A method according to claim 1, wherein the directing step (b) is performed selectively in dependence on an airspeed of the aircraft.

9. A method according to claim 8, wherein the compressor gas is directed into heat exchange relationship with the engine oil in the heat exchanger when the airspeed of the aircraft is below a determined or predetermined threshold value.

10. A method according to claim 9, wherein the bleed flow of compressor gas is stopped or reduced when the airspeed of the aircraft is above the threshold value.

11. A method according to claim 9, wherein the threshold value is determined in dependence on aircraft flight cycle conditions.

12. A method according to claim 1, wherein the gas turbine aircraft engine is supported by a pylon to which the heat exchanger is mounted, the method further comprising the step of exhausting the bleed flow of compressor gas into wake produced by the pylon.

13. A method according to claim 1, wherein the bleed flow of compressor gas is directed across the aerodynamic surface of the heat exchanger.

14. A method according to claim 1, wherein the bleed flow of compressor gas is directed across a surface of the heat exchanger opposed to the aerodynamic surface of the heat exchanger.

15. A propulsion arrangement for an aircraft, the arrangement comprising: a heat exchanger mounted to an external surface of an aircraft component so as to define part of an aerodynamic surface to a flow of ambient air; a gas turbine engine having a compressor with a bleed offtake configured to bleed gas from the compressor; an oil system configured to route engine oil through the heat exchanger, and a duct arrangement fluidly connecting the bleed offtake to the heat exchanger and configured to direct a flow of the compressor gas across the heat exchanger in heat-exchange relationship with the engine oil, the arrangement further including a flow controller actuable to regulate the flow of the compressor gas across the heat exchanger.

16. An arrangement according to claim 15, wherein the flow controller is programmed to regulate the flow of the compressor gas across the heat exchanger in dependence on at least one of the following: (i) a temperature of the engine oil within the gas turbine engine; (ii) an airspeed of the aircraft; and (iii) aircraft flight cycle conditions.

17. An arrangement according to claim 15, wherein the gas turbine engine is supported by a pylon to which the heat exchanger is mounted, the pylon having an exhaust aperture, and the duct arrangement being configured to direct the flow of the compressor gas into the pylon, through the exhaust aperture and into wake produced by the pylon during movement through the ambient air.

18. An arrangement according to claim 17, wherein the exhaust aperture is located upstream of the heat exchanger, relative to the flow of the compressor gas.

19. An arrangement according to claim 18, wherein the heat exchanger is located in a region of a trailing edge of the pylon.

20. An arrangement according to claim 17, wherein the exhaust aperture is located downstream of the heat exchanger, relative to the flow of the compressor gas.

21. An arrangement according to claim 20, wherein the exhaust aperture is located in the region of the trailing edge of the pylon.

22. An arrangement according to claim 17, wherein the flow controller comprises a mechanism operable to vary a size of the exhaust aperture.

23. An arrangement according to claim 15, wherein the flow controller comprises a control valve within the gas turbine engine.

24. An arrangement according to claim 15, wherein the oil system includes a bypass valve selectively operable to prevent the flow of engine oil through the heat exchanger.

25. An arrangement according to claim 15, wherein the heat exchanger is remote from the gas turbine engine, and the engine oil system includes self-sealing couplings arranged to permit disconnection and reconnection of the oil system to the heat exchanger, the oil system further comprising a bypass valve connected across the self-sealing couplings.

26. A method of operating a gas turbine aircraft engine supported by a pylon, the pylon defining an aerodynamic surface and incorporating a heat exchanger, the gas turbine aircraft engine having a compressor, an oil system configured to route engine oil through the heat exchanger, and a duct arrangement fluidly connecting the compressor to the heat exchanger, the method involving: flowing engine oil through the heat exchanger, directing a bleed flow of compressor gas drawn from the compressor along the duct arrangement and into heat-exchange relationship with the engine oil in the heat exchanger, and exhausting the bleed flow of compressor gas into wake produced by the pylon.

27. An aircraft propulsion arrangement, the arrangement including: a gas turbine engine supported by a pylon and having a compressor with a bleed offtake configured to bleed gas from the compressor, the pylon defining an aerodynamic surface and incorporating a heat exchanger; an oil system configured to route engine oil through the heat exchanger; and a duct arrangement fluidly connecting the bleed offtake to the heat exchanger and configured to direct a flow of the compressor gas across the heat exchanger in heat-exchange relationship with the engine oil and to exhaust the flow of the compressor gas into wake produced by the pylon.

* * * * *